United States Patent Office 2,817,677
Patented Dec. 24, 1957

2,817,677
PHENANTHRENE DIOLS AND PREPARATION THEREOF

Lee A. Subluskey, Wilmington, Del., assignor to Hercules Powder Company, Wilmington, Del., a corporation of Delaware No Drawing. Application April 4, 1956
Serial No. 575,941
9 Claims. (Cl. 260—476)

This invention relates to new diols that may be prepared from hydrogenated rosin and, more specifically, to the diols obtained by the reduction of the lactone of hydroxytetrahydroabietic acid and the lactone of hydroxytetrahydrodextropimaric acids.

It is well known that a crystalline lactone may be obtained from partially hydrogenated rosin, i. e., a rosin containing a dihydroabietic acid, by treatment of the rosin with sulfuric acid. This lactone is commonly called "the lactone of hydroxytetrahydroabietic acid" and is characterized by a melting point of 131°–132° C. and $[\alpha]_D$ —3°. The lactones of hydroxytetrahydrodextropimaric acid and hydroxytetrahydroisodextropimaric acid, having melting points of 98.5°–100° C. and 109°–110° C., respectively, may be produced in the same way, dihydrodextro- and isodextro-pimaric acids being present with dihydroabietic acid in partially hydrogenated rosin. The structure of these lactones has not been definitely established, but there are several convincing arguments for the structure in which the angular methyl group is at the 4b-position and the alcoholic oxygen at the 4a-position, the angular methyl group having shifted during lactonization from the 4a-position which it has in dihydroabietic acid or dihydrodextropimaric acid to the 4b-position. If such a shift did not occur, then the angular methyl group is at the 4a-position and the alcoholic oxygen is at the 4b-position. Whatever may be the position of the angular methyl group, these lactones are extremely stable and do not readily undergo such reactions as hydrolysis, etc., which break the lactone ring.

In accordance with this invention, it has been found that the lactones of hydroxytetrahydroabietic acid and hydroxytetrahydrodextropimaric acids may be reduced by means of an alkali metal aluminum hydride to produce dialcohols wherein there is a hydroxyl attached to either the 4a- or 4b-position and the carboxyl group in the 1-position has been reduced to a hydroxy-methyl group. These new diols are believed to have the following structures:

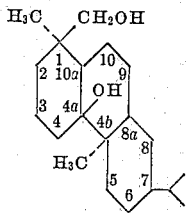 and 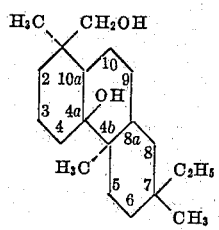

and hence may be named tetradecahydro-4a-hydroxy-1-hydroxymethyl - 7 - isopropyl-1,4b-dimethylphenanthrene and tetradecahydro-7-ethyl-4a-hydroxy-1-hydroxymethyl-1,4b,7-trimethylphenanthrene, respectively. However, as pointed out above, the angular methyl group shown at the 4b-position may not have shifted during lactonization, in which case the hydroxyl group would be in the 4b-position and the compounds would then be tetradecahydro-4b - hydroxy-1-hydroxymethyl-7-isopropyl-1,4a-dimethylphenanthrene and tetradecahydro-7-ethyl-4b-hydroxy-1-hydroxymethyl-1,4a,7-trimethylphenanthrene, respectively. Thus, the new alcohols of this invention are best defined as the diols obtained by the reduction of the lactones of hydroxytetrahydroabietic and hydroxytetrahydrodextropimaric acids in accordance with this invention.

The following examples will illustrate the preparation of these new alcohols and their esters and the proof of their structure.

PREPARATION OF THE DIOLS

A. The diol obtained from the lactone of hydroxytetrahydroabietic acid

A solution of 10 parts of the lactone obtained by treatment of dihydroabietic acids with sulfuric acid and having a melting point of 131°–132° C. in 500 parts of dry benzene was added during two hours to an agitated solution of 5.6 parts of lithium aluminum hydride in 500 parts of anhydrous diethyl ether. The reaction mixture was agitated and refluxed for three days, after which it was poured onto cracked ice so as to decompose any unreacted hydride and then was stirred with 100 parts of 20% sulfuric acid for three hours. The ether-benzene solution was separated, washed, and dried. Removal of the ether and benzene yielded 9.14 parts (90% of the theoretical yield) of the white crystalline diol. When the diol is melted slowly, two melting points can be observed, one at 137.5°–138.5° C. and one at 149°–150° C. Several recrystallizations from isooctane failed to change these melting points. The carbon and hydrogen analyses of this diol were in agreement with the calculated values.

B. The diol obtained from the lactone of a hydroxytetrahydrodextropimaric acid To an agitated suspension of 3 parts of lithium aluminum hydride in 250 parts of anhydrous ether was added 3.3 parts of the lactone obtained by treatment of dihydrodextropimaric acid with sulfuric acid and having a melting point of 98.5°–100° C. The reaction mixture was agitated at room temperature for several days and then was treated with 12 parts of ethyl acetate, after which it was stirred with 100 parts of 10% sulfuric acid. The two layers were separated and the ether solution was washed with dilute acid and then water until neutral and dried. On removing the ether there was obtained 3.1 parts of the crystalline diol. On recrystallization from ethyl acetate several times, the pure diol was found to have a melting point of 181°–182° C. The carbon and hydrogen analyses of this diol were in agreement with the calculated values.

PREPARATION OF THE MONOACETATE

One part of the diol prepared in (A) was dissolved in a mixture of 30 parts of acetic anhydride and 3 parts of pyridine. The reaction mixture was allowed to stand at room temperature for about 16 hours and then was poured into 100 parts of ice water. The precipitate which formed was separated by filtration and then was crystallized from a mixture of methanol and water. On recrystallization to a constant melting point, the monoacetate was found to melt at 71.0°–71.5° C. The carbon and hydrogen analysis agreed with that calculated for the monoacetate.

PREPARATION OF THE MONOBENZOATE

Ten parts of the diol, prepared as described in (A), was dissolved in 100 parts of pyridine and 5 parts of benzoyl chloride was added. The reaction mixture was heated to about 80° C. for 20 minutes and then was poured into 300 parts of water. The insoluble oil that separated was dissolved in 100 parts of ether and the ethereal solution was washed with a 10% aqueous hydrochloric acid solution, then with a saturated sodium bicarbonate solution, and finally with water. The crude monobenzoate obtained on removal of the ether was crystallized from a mixture of methanol and water and amounted to 11.7 parts (88% of the theoretical yield) having a melting point of 104°–105.5°. It was further recrystallized to a constant melting point of 105.5°–106.5° C. The carbon and hydrogen analysis agreed with that calculated for the monobenzoate.

The new resin dialcohols of this invention are prepared by the reduction, with an alkali metal aluminum hydride, of the lactones known as the lactones of hydroxytetrahydroabietic acid and hydroxytetrahydropimaric acid, said lactones being those obtained from a dihydroabietic acid and having a melting point of 131°–132° C. or those obtained from dihydrodextropimaric acid and having a melting point of 98.5°–100.° C. or from dihydroisodextropimaric acid and having a melting point of 109°–110° C. These lactones are readily obtained by treatment of a hydrogenated rosin containing dihydroabietic and dihydropimaric acids or by treatment of the pure acids with concentrated sulfuric acid in the presence of a solvent in which the rosin or rosin acid is soluble and the lactone is insoluble. It is now rather well-established that in said sulfuric acid treatment there is a shift of the methyl group attached to the 4a-position of the hydrorosin acid nucleus to the 4b-position. Thus the compound known to the art as the lactone of hydroxytetrahydroabietic acid is believed to be the lactone of tetradecahydro-4a-hydroxy-7-isopropyl-1,4b-dimethyl-1-phenanthrenecarboxylic acid, but unequivocal proof of the position of the angular methyl group has not yet been obtained. By the term "lactone of hydroxytetrahydroabietic acid" or "lactone of hydroxytetrahydrodextropimaric acid" as used in this specification and the claims appended hereto is meant the lactone obtained by treatment of a dihydroabietic or dihydrodextropimaric acid with sulfuric acid, regardless of whether or not the methyl group has shifted from the 4a- to the 4b-position.

The reduction of the lactone with the alkali metal aluminum hydride is generally carried out in solution. Any inert organic solvent may be used as the medium for the reaction provided that it is a solvent for either one or both of the reactants. Suitable solvents that may be used are diethyl ether, di-n-butyl ether, dioxane, tetrahydrofuran, diethylcarbitol, benzene, hexane, toluene, etc. The reaction should be carried out under anhydrous conditions in order to avoid hydrolysis of the hydride and reduction in the yields thereby. Any alkali metal aluminum hydride such as lithium, sodium, etc., aluminum hydrides may be used for the reduction of the lactone to the diol, but lithium aluminum hydride is preferably used because of its greater solubility in organic solvents. The amount of alkali metal aluminum hydride used is preferably within the ratio of from about 0.5 to about 10 moles per mole of lactone, and more preferably is from about 1 to about 5 moles per mole of lactone. In general, the reaction is carried out at a temperature of from about 0° C. to about 50° C., and preferably at a temperature of from about 15° C. to about 35° C.

The alkali metal aluminum complex which is formed as an intermediate in this reaction is hydrolyzed by the addition of water, an acid, or a base. Usually an acid is used, preferably a mineral acid such as sulfuric acid, phosphoric acid, etc., but an alkali metal hydroxide such as sodium hydroxide, potassium hydroxide, etc., may be used with equivalent results. The concentration of the hydrolytic agent may be varied over a wide range since water itself may be used, but, in general, if an acid or base is used, the concentration will be within the range of from about 5% to about 25%. The hydrolysis readily takes place at room temperature and elevated temperatures are not required but may be used if desired.

The method by which the diol is separated from the reaction mixture will, of course, depend upon the type of solvent used for carrying out the reaction. If a water-immiscible solvent was used for the reduction reaction, in which solvent the diol is soluble, the diol will then be present in the organic phase and can be separated from that phase by removal of the solvent. It may also be separated from the reaction mixture by extraction with a suitable water-immiscible solvent, as for example, ether, benzene, toluene, hexane, etc. These new diols are crystalline solids and may be purified by crystallization procedures.

The new diols produced in accordance with this invention may be esterified by reacting them with an acyl anhydride or acyl halide, as for example, acetic anhydride, propionic anhydride, phthalic anhydride, ketene, acetyl chloride, benzoyl chloride, etc. Thus, it is possible to produce any aliphatic, cycloaliphatic, aryliphatic, or aromatic acid ester of these important new alcohols. Of particular importance are the lower alkanoic acid esters such as the monoacetate, monopropionate, monobutyrate, etc., and the aromatic carboxylic acid esters such as the monobenzoate, monophthalate, etc. This esterification reaction is generally carried out in an organic solvent that is a solvent for the diol. The temperature employed may be varied over a wide range and will depend upon the acylating agent used.

The new diols of this invention are valuable intermediates for the preparation of synthetic materials. They are particularly important in the synthesis of polymeric esters, which products may be prepared by reaction of the diols with dibasic acids. They may also be reacted with ethylene oxide to produce valuable polymeric ethers. The esters of these diols may be used as plasticizers, particularly for cellulose esters and ethers.

This application is a continuation-in-part of my copending application Serial No. 327,150, filed December 20, 1952.

What I claim and desire to protect by Letters Patent is:

1. As a new composition of matter a compound selected from the group consisting of the diol, obtained by the reduction with an alkali metal aluminum hydride of a lactone selected from the group consisting of the lactone of hydroxytetrahydroabietic acid and the lactone of a hydroxytetrahydrodextropimaric acid, and the monoesters of said diols wherein the acyl radical of the ester group is that of an acid selected from the group consisting of lower alkanoic acids and mononuclear aromatic carboxylic acids.

2. The diol obtained by the reduction with an alkali metal aluminum hydride of the lactone of hydroxytetrahydroabietic acid.

3. The diol obtained by the reduction with an alkali metal aluminum hydride of the lactone of a hydroxytetrahydrodextropimaric acid.

4. A lower alkanoic acid monoester of the diol obtained by the reduction with an alkali metal aluminum hydride of the lactone of hydroxytetrahydroabietic acid.

5. The monoacetate of the diol obtained by the reduction with an alkali metal aluminum hydride of the lactone of hydroxytetrahydroabietic acid.

6. The monobenzoate of the diol obtained by the reduction with an alkali metal aluminum hydride of the lactone of hydroxytetrahydroabietic acid.

7. The process which comprises reacting a lactone selected from the group consisting of the lactone of hydroxytetrahydroabietic acid and the lactone of a hydroxytetrahydrodextropimaric acid with an alkali metal aluminum hydride and hydrolyzing the complex so obtained.

8. The process which comprises reacting the lactone of hydroxytetrahydroabietic acid with an alkali metal aluminum hydride and hydrolyzing the complex so obtained.

9. The process which comprises reacting the lactone of hydroxytetrahydrodextropimaric acid with an alkali metal aluminum hydride and hydrolyzing the complex so obtained.

No references cited.